(12) United States Patent
Piper et al.

(10) Patent No.: US 9,542,708 B2
(45) Date of Patent: Jan. 10, 2017

(54) EVENT SERVER USING CACHING

(75) Inventors: Andrew Piper, Amersham (GB); Alexandre de Castro Alves, San Jose, CA (US); Seth White, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1120 days.

(21) Appl. No.: 12/332,276

(22) Filed: Dec. 10, 2008

(65) Prior Publication Data

US 2009/0292877 A1    Nov. 26, 2009

Related U.S. Application Data

(60) Provisional application No. 61/054,658, filed on May 20, 2008.

(51) Int. Cl.
*G06F 17/30* (2006.01)
*G06Q 40/04* (2012.01)

(52) U.S. Cl.
CPC ......... *G06Q 40/04* (2013.01); *G06F 17/30132* (2013.01)

(58) Field of Classification Search
CPC ..... G06F 17/30; G06F 17/30132; G06Q 40/04
USPC .......................................... 707/736; 711/711
See application file for complete search history.

(56) References Cited

U.S. PATENT DOCUMENTS

| | | | |
|---|---|---|---|
| 5,583,561 A | 12/1996 | Baker | |
| 5,924,096 A | 7/1999 | Draper | |
| 6,466,949 B2 | 10/2002 | Yang | |
| 6,847,993 B1 | 1/2005 | Novaes | |
| 6,857,082 B1 | 2/2005 | Josan | |
| 6,874,057 B2* | 3/2005 | Dwyer et al. | 711/3 |
| 7,089,211 B1 | 8/2006 | Trostle | |
| 7,111,001 B2 | 9/2006 | Harris | |
| 7,155,438 B2 | 12/2006 | Potter | |
| 2002/0016867 A1 | 2/2002 | Kampe | |
| 2005/0086656 A1* | 4/2005 | Whitlock et al. | 718/1 |
| 2005/0229183 A1 | 10/2005 | Araujo | |
| 2006/0080120 A1* | 4/2006 | Tcherevik | 705/1 |
| 2006/0184410 A1* | 8/2006 | Ramamurthy et al. | 705/8 |
| 2006/0282695 A1* | 12/2006 | Mital et al. | 713/502 |
| 2008/0052556 A1 | 2/2008 | Donovan | |
| 2008/0209078 A1 | 8/2008 | Bates | |

OTHER PUBLICATIONS

"Designing Grit Tag Libraries and Grid Beans," Nacar et al. (2006).*
Pallickara, "Efficient Matching of Events in Distributed Middleware Systems", Journal of Digital Information Management, Jun. 2004, pp. 79-86, vol. 2, No. 2. retrieved from: http://grids.ucs.indiana.edu/ptliupages/publications/jdim-vol2-num2.pdf.

(Continued)

*Primary Examiner* — Vincent Boccio
(74) *Attorney, Agent, or Firm* — Tucker Ellis LLP

(57) ABSTRACT

An event server adapted to receive events from an input stream and produce an output event stream. The event server uses a processor using code in an event processing language to process the events. The event server obtaining input events from and/or producing output events to a cache.

17 Claims, 3 Drawing Sheets

(56) References Cited

OTHER PUBLICATIONS

Pallickara, "On the Matching of Events in Distributed Brokering Systems", 11 pages. retrieved from: http://grids.ucs.indiana.edu/ptliupages/publications/MatchingEvents.pdf.

Carzaniga, "Architectures for an Event Notification Service Scalable to Wide-area-Networks", 115 pages. retrieved from: http://www.ifs.uni-linz.ac.at/ifs/staff/kimmerstorfer/literature/event_services/phd_thesis.pdf.

White, et al., "WebLogic Event Server: A Lightweight, Modular application server for Event Processing", DEBS '08, Jul. 2-4, 2008, 8 pages. retrieved from: http://blogs.oracle.com/CEP/paper10.pdf.

BEA Systems, Inc., "BEA WebLogic Server", May 2007, 508 pages. retrieved from: http://e-generation.beasys.com/wls/docs92/pdf/ejb.pdf.

dmreview.com, "Event Stream Processing", 3 pages. retrieved from: http://www.dmreview.com/dmdirect/20050729/1033537-1.html.

Nenov, et al., "Memory Sensitive Caching in Java", International Conference on Computer Systems and Technologies, CompSysTech 2005, 6 pages. retrieved from: http://ecet.ecs.ru.acad.bg/cst05/Docs/cp/SII/II.20.pdf.

* cited by examiner

EVENT SERVER USING CACHING

CLAIM OF PRIORITY

This application claims priority to U.S. Provisional Application No. 61/054,658 entitled "EVENT SERVER USING CACHING" by Seth White, et al., filed May 20, 2008 which is hereby incorporated by reference.

BACKGROUND

Event servers are used to process on streams of data in realtime. Typically, one or more input streams are converted into a much smaller output stream.

DETAILED DESCRIPTION

Figure 1:
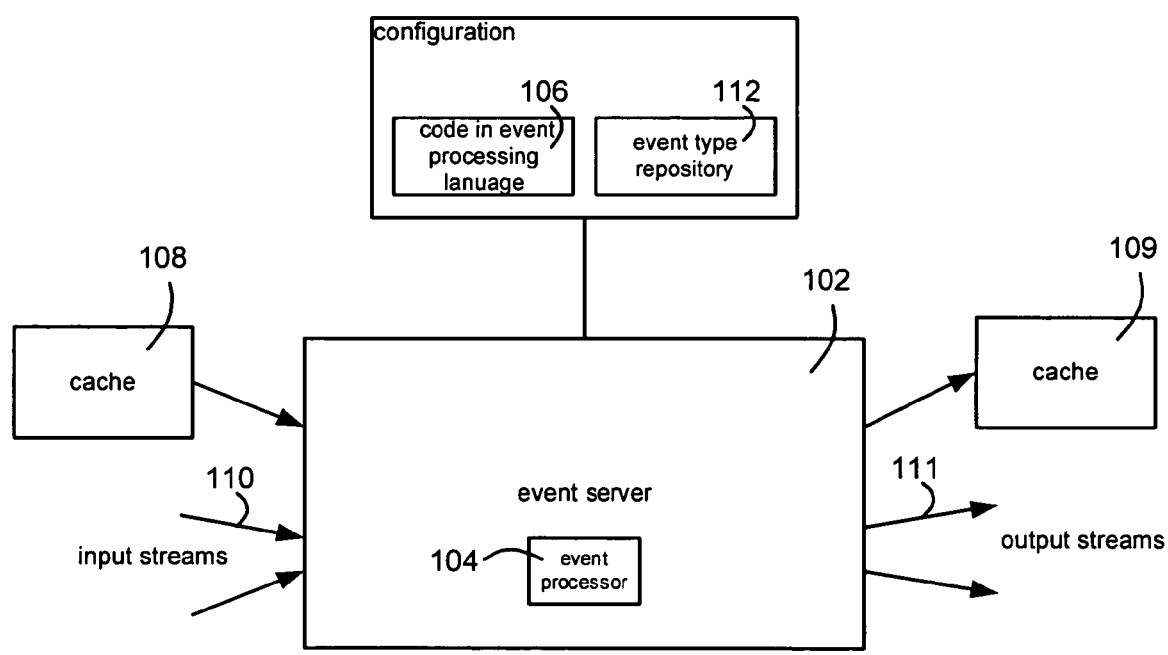
FIG. 1 shows a caching system of one embodiment.

One embodiment of the present inventions is an event server 102, adapted to receive events from an input stream 110 and produce an output event stream 111. The event server 102 can use a processor 104 using code 106 in an event processing language to process the events. The event server can obtain input events from and/or producing output events to a cache 108 or 109.

The use of a cache with the event server 102 allows for flexibility in the operation of the event server 102.

In one embodiment, the same event processing language code 106 can be used to process input from a cache 108 or from a stream 110.

The cache can be configured to be an event source or event sink.

The event server can use an event type repository 112 to indicate at least one source or sink of events. A cache can be registered in the event type repository 112 as a source or sink of events.

In one embodiment, a change in the event type repository 112 can change whether event processing language code 106 uses a stream or cache as the source or sink.

The cache can be a JCache based cache.

Caching can provide event driven applications with increased availability and high performance. The following describes an example of how caching functionality can be supported by an Event Server. Integration points can include the JAVA programming model, EPL query language, configuration, and management systems.

An Event Server application can publish output events to a cache in order to make them highly available or available to other applications running in the server. Publishing events to a cache can also allow for the events to be written asynchronously to secondary storage by the cache implementation.

In one example, an application publishes events to a cache while the market is open and then processes the data in the cache after the market closes.

A cache can be configurable as a listener on any Event Server component (Stage) that generates events, including input adapters, streams, pojos, and processors.

An Event Server application can need to access non-stream data in order to do its work. Caching this data can dramatically increase the performance of the application.

The component types that can be allowed direct programmatic access to a cache are adapter (input and output), user-defined Event Processing Language (EPL) functions, and Plain Old JAVA Objects (POJO) components (stage and non-stage).

A special case is consuming data from a cache during evaluation of an EPL user-defined function. Authors of user-defined functions can be able to have a cache resource injected into the component that implements the function.

An example of this use case is the "in-play" sample application which uses a user-defined function to join together trade data with company data.

In one embodiment, the cache can be accessed directly from the EPL. A cache can function essentially as another type of stream data source to a processor, so querying a cache will be very similar to querying a stream.

In one example, at the end of a trading day, the cache will contain orders as well as trades used to execute the order. It can be useful to query the cache in order to find all trades related to an order.

A cache may contain data that needs to be updated or deleted by an Event Server application component. For example, an order object that is held in a cache may need to be updated as individual trades that fulfill the order are executed. An order that is canceled may need to be deleted from the cache. Any component that may be injected with a reference to a cache (adapters, functions, and POJOs) may be able to update and delete from the cache.

Caching support can include support for local, single-JVM caches using a caching implementation. The caching framework can support the addition of distributed caching using the cache.

Caching support can include integration with third-party products that provide both local and distributed caching. Products that can be supported include GemFire, Tangosol, GigaSpaces and OSCache.

A cache can be preloaded with data when an application is deployed.

A cache can periodically refresh or reload its state. This can be done incrementally and not halt the application or cause spikes in latency.

Invalidation of cached data can be scheduled. This can be done incrementally and not halt the application or cause spikes in latency.

Cached data can be periodically flushed. This can be done incrementally and not halt the application or cause spikes in latency.

Support for querying a cache using EPL can be provided.

A cache's configuration can be dynamically updated using JMX and also runtime statistics accessed.

Appendix I shows exemplary JAVA programming interfaces.

Large local cache sizes (4-16 GB) can be supported.

Event Server applications can use a caching implementation such as the built-in Event Server local cache or third-party caching solutions like GemFire, Tangosol, or GigaSpaces. A configured instance of a caching implementation can be referred to as a "caching system" in this specification. A caching system can define a named set of configured caches as well as configuration for remote communication if any of the caches are distributed across multiple machines.

A caching system can be configured at the application level. In one embodiment, there is an application that owns the caching system instance in some sense. Other applications may use the caching system, but in order to do so they can be deployed after the application that owns the caching system, so that the caching system is available to them.

Caching systems can be configured using the dynamic/external configuration feature of the Event Server. Custom Spring tags can also be provided in order to configure caching-related entities that are part of an Event Server event processing network (EPN). These caching related entities may or may not be a Stage in the event processing network. This depends on how they are used in a particular application context.

The example below shows how a local cache(s) can be configured using the Event Server local cache implementation. The example is not normative. The XML fragment below would be part of the external configuration for the application declaring the caching system.

```
<wlevs-caching-system>
    <name>caching-system-id</name>
    <cache>
        <name>cache-id</name>
        <max-size>100000</max-size>
        <eviction-policy>LRU</eviction-policy>
        <time-to-live>3600</time-to-live>
    </cache>
    <cache>
        ...
    </cache>
</wlevs-caching-system>
```

In one embodiment, there are three fundamental use cases involved in configuring a caching system: using the Event Server cache, using a third-party cache implementation that is packaged as part of the owning application bundle, and using a third-party cache implementation that is packaged in a separate bundle.

An application may simply specify external configuration when using the built in Event Server caching implementation. Nothing else is required to configure and use the caching system as long as there is only one caching system defined for the application.

The application may also declare an explicit element in its Spring application context to represent the caching system, like so:
    <caching-system id="caching-system-id"/>

In this case, the value of the id attribute can match the name specified for the caching system in the external configuration metadata. If the application wishes to allow other applications to use the caching system, it can specify that the caching system be advertised.
    <caching-system id="caching-system-id" advertise="true"/>

In one embodiment, the following options are also available when using the Event Server caching implementation. They are a special case of the configuration that is more typically used for a third-party caching implementation.

```
<caching-system id="caching-system-id"
    class="com.bea.wlevs.cache.WlevsCachingSystem"/>
<caching-system id="caching-system-id" provider="wlevs"/>
```

Either option may be used without requiring any additional packages to be imported or exported by the application bundle. In one embodiment, it is not necessary for the application bundle to import the com.bea.wlevs.cache package if the class attribute is used (this package is already imported by the Spring bundle). In one embodiment, the id attribute in the Spring caching-system element must match the name attribute specified in the dynamic configuration in both cases above.

An exemplary Third-party caching implementation (included in application bundle) is described below.

The idea here is to allow users to keep things simple when using a third-party cache by doing a couple of things:
1. Package both their application code and caching implementation code in a single bundle.
2. Avoid using or implementing a factory.
3. Avoid using the OSGi service registry.
4. Configure their caching system as much like a simple Spring bean is possible.

Here is what the caching-system element looks like in this case.
    <caching-system id="caching-system-id" class="caching-system-implementation-class"/>

The class attribute specifies a JAVA class that must implement the com.bea.wlevs.cache.api. CachingSystem interface. The class attribute can be required when using a third-party caching implementation since the default value for class is com.bea.wlevs.cache.WlevsCachingSystem which specifies that the BEA caching implementation is being used. The external configuration for the caching system can be part of the external configuration for the application. No additional imports or exports of packages related to caching are required of the application bundle since the caching implementation is part of the bundle. The advantage of this approach is to avoid the overhead of creating a separate bundle for the caching implementation and the extra complexity involved with managing the lifecycle of that bundle.

Exemplary Third-party caching implementation (separate bundle) is described below.

A simple way to configure a separate caching bundle is to begin by creating a bundle containing just the Spring configuration for the caching system. In other words, a Spring application context that contains only a caching-system element. This caching bundle can then be deployed along with the external configuration for the caching system and the caching system is advertised so that other bundles can use the caching system.

The caching system tag in the Spring application context can look like this:

```
<caching-system if ="caching-system-id"
    class="caching-system-implementation-class"
    advertise="true"/>
```

The bundle containing the caching system could be provided by the event server company, a caching vendor, or the customer. Alternately, under a factory approach, a bundle wishing to declare a caching system instance can include a tag like the following in its Spring application context.

```
<caching-system id="caching-system-id"
    provider="provider-name"/>
```

The caching implementation bundle can contain a tag in its application context that looks like this:
    <factory id="factory-id" provider-name="provider-name"> <class>package.name.class.name</class>
    </factory>

The caching-system element can contain static Spring configuration. The caching-system element can be a factory bean for caches in the Spring sense.

A caching system can be configured this way if custom tags are not used.

```
<bean id="caching-system-id" class="caching-system-
    implementation-class"/>
```

An individual cache that is part of a caching system is configured (from the point of view of the application context) using the <cache> element in the Spring configuration file.

```
<cache id="cache-id" cache-name="alternative-cache-name">
    <caching-system ref="caching-system-id"/>
</cache>
```

The caching-system attribute can specify the caching system that contains the cache. The cache-name attribute can be optional. The cache-name attribute can be used to specify the name for the cache in the caching system if the name is different than the value of the id attribute.

The cache bean can implement the java.util.Map interface.

A cache element itself may not require external configuration data. The configuration of individual caches is part of the metadata for the caching system. The caching system can be responsible for creating the cache associated with a particular name and returning a reference to the cache.

A cache element need not be exported as an OSGi service using the advertise attribute.

A cache can be configured this way if custom tags are not used:

```
<bean id="cache-id" factory-bean="caching-system-id"
factory-method="getCache">
    <constructor-arg value="cache-id"/>
</bean>
```

In one embodiment, a cache will only be required to explicitly reference a caching system when the caching system that is to be used is ambiguous. In one example:
1. A caching system is not ambiguous when a single caching system is declared as part of the same application that declares the cache. (When the Event Server cache being used, a caching system is declared implicitly in the Spring application context whenever a caching system is configured using the dynamic configuration facility. All a developer needs to do is declare the dynamic configuration and then declare cache elements that reference it.)
2. No caching system is declared by the application, and a single caching system has been advertised by another application.

Under these circumstances, the following form can be allowed for the cache element:
```
<cache id="cache-id" cache-name="alternative-cache-
    name"/>
```

An object that implements user-defined EPL functions can be configured like a regular spring bean:
```
<bean id="epl-function-id" class="epl-function-imple-
    mentation-class"/>
```

The class attribute can specify an arbitrary JAVA class or POJO. Public member methods on this class can be invoked by a processor as a user-defined function in an EPL query. The syntax for referencing a method of this bean as a user-defined function within an EPL query can be:
    <epl-function-id>.<method-name>

For example, here is an exemplary EPL query that invokes a user-defined function:
    insert into InstitutionalOrder
    select er.orderKey as key,
        er.symbol as symbol,
    er.shares as cumulativeShares
    from ExecutionRequest er retain 8 hours with unique key
    where not orderFunction.existsOrder(er.orderKey)

In this example, a processor can be injected with the EPL function bean like so

```
<processor id = "tradeProcessor">
    <function ref="orderFunction"/>
</processor>
```

The Spring bean name of the user-defined function being can be used within the EPL query to refer to the bean. It is possible to inject a processor with multiple EPL function components by specifying multiple <function> sub-elements of <processor>.

If query-name is specified

```
<processor id = "tradeProcessor">
    <function query-name="queryName" ref="orderFunction"/>
</processor>
``` then the syntax for referencing a method is:
    queryName.<method-name>

If a user-defined function bean needs access to a resource such as a cache it can provide a public method for injecting the resource and declare a reference to the resource as part of its Spring configuration.

```
<bean id="epl-function-id">
    <property name="cache" ref="cache-id"/>
</bean>
```

User-written POJOs can be configured using the bean element in the Spring configuration file. A cache can be injected into a POJO component using the normal spring mechanism for referencing another bean.

```
<bean id="bean-id" >
    <property name="map" ref="cache-id"/>
</bean >
```

The POJO class can have a method like this:

```
import JAVA.util.Map;
public class MyComponent {
    ...
    public void setMap (Map map) {...}
}
```

In one example, adapter that references a cache can be configured. This case can be similar to the POJO case in the previous section.

```
<adapter id="input-adapter-id">
    <instance-property name="map" ref="cache-id"/>
</adapter >
```

The adapter class can contain a public setter method for the Map:

```
import JAVA.util.Map;
public class MyAdapter {
  ...
  public void setMap (Map map) {...}
}
```

A cache can be configured as a listener in order to receive events. For example,

```
<cache id="cache-id">
  <caching-system ref="caching-system-id"/>
</cache>
<stream id="tradeStream">
  <listener ref="cache-id"/>
</stream>
``` registers a cache as a listener of the stream. New events that are received by the cache can be inserted into the cache. In one example, Map.put ( ) is called. Remove events that are received by the cache result in Map.remove ( ) can be called.

A couple of options can be provided for keys to index a cache that contains events.

Option 1 is to allow the application developer to specify a property name for the key property when a cache is declared.

```
<cache id="cache-id" key-properties="key-property-name">
  <caching-system ref="caching-system-id"/>
</cache>
```

Events that are inserted into the cache can be required to have a property of this name at runtime, else an exception is thrown.

Option 2 is to provide an annotation, such as com.bea.wlevs.ede.api.Key, which can be used to annotate an event property. The ability to identify a unique key for an event.

Option 3 is not to specify a key. In this case the event object itself will serve as both the key and value when an event is inserted into the cache. The event class can provide a valid equals and hashcode method that takes into account the values of the key properties, in this case.

Option 4 is used to specify a composite key in which multiple properties form the key. An explicit composite key is indicated by specifying a key class. A key class can be a JAVABean whose public fields match fields that are present in the event class. The matching can be done according to the field name:

```
<cache id="cache-id" key-class="key-class-name">
  <caching-system ref="caching-system-id"/>
</cache>
```

A cache can be a source of events. For example, a cache can generate an event when a new mapping is inserted into the cache by calling the put method. A listener may be attached to a cache using the listener sub-element.

```
<cache id="cache-id">
  <caching-system ref="caching-system-id"/>
  <listener ref="cache-listener-id"/>
</cache>

<bean id="cache-listener-id" class="cache-listener-implementation-class"/>
```

Cache listeners can implement the com.bea.cache.jcache.CacheListener interface.

A cache may be configured with a custom loader that is responsible for loading data into the cache when there is a cache miss. A loader may be configured for a cache using the loader sub-element.

```
<cache id="cache-id">
  <caching-system ref="caching-system-id"/>
  <loader ref="cache-loader-id"/>
</cache>
<bean id="cache-loader-id" class="cache-loader-implementation-class"/>
```

Cache loaders can implement the com.bea.cache.jcache.CacheLoader interface.

A cache may be configured with a custom store that is responsible for storing data when data is written from the cache to a backing store. A store can be configured for a cache using the store sub-element.

```
<cache id="cache-id">
  <caching-system ref="caching-system-id"/>
  <store ref="cache-store-id"/>
</cache>
<bean id="cache-store-id" class="cache-store-implementation-class"/>
```

EPL query language can be enhanced so that a cache can be referenced in much the same way that a stream is referenced currently. For example, the query below can perform an inner join between trade events received from a stream and company data held in a cache. This is an example of a common use case in which an event is "enriched" with data from another source.

```
INSERT INTO EnrichedTradeEvent
SELECT trade.symbol, trade.price, trade.numberOfShares, company.name
FROM TradeEvent trade RETAIN 8 hours, Company company
WHERE trade.symbol = company.id
```

Note that the Company type can be used in the SELECT, FROM, and WHERE clauses. In the query above TradeEvent and Company are types that are registered in the event type repository. The FROM clause can continue to reference only registered types, as opposed to directly referencing a node in the EPN. The Company type can be mapped to a particular node (a cache in this case) that is the source for instances of the type as part of the XML configuration. The mapping can be external to the query, in other words, just as it is for Streams.

Another interesting aspect to the enrichment example above is that Company data can be pulled from the cache instead of being pushed like it is in the case of a Stream. Pulling data from a cache can be the default behavior while push remains the default behavior for streams. In one example, this means that the query fires only when trade events arrive—are pushed to the query by a stream. In one example, company instances are not events but simply data values that are pulled from the cache.

A cache can declare a type for the values that it contains in its Spring configuration.

```
<wlevs:cache id="cacheId">
    <value-type name ="Company"/>
</wlevs:cache>
```

In this case, Company is a type that is registered in the event type repository. A cache can be wired to a processor as a source just as a stream is, but as was noted above data will be pulled from the cache by default instead of pushed to the processor.

```
<wlevs:stream id="streamId"/>
<wlevs:processor id="processorId">
    <source ref="cacheId">
    <source ref="streamId">
</wlevs:processor>
```

In the example that we have been flushing out so far, the query processor examines its sources and detects that the cache is a source for the Company type. The query processor then will pull data from the cache during query evaluation. When the query processor matches a type in the from clause to a type supplied by a cache it will assume that instances of that type are to be pulled from the cache essentially.

If a value type is not specified by the cache, then the Company type can be mapped to a cache as part of the dynamic/external configuration for the query. For example,

```
<processor>
    <name>processorId</name>
    <rules>
        <rule id="ruleId">
            <query>
            INSERT INTO EnrichedTradeEvent
            SELECT trade.symbol, trade.price, trade.numberOfShares,
            company.name
            FROM TradeEvent trade RETAIN 8 hours, Company company
            WHERE trade.symbol = company.id
            </query>
            <source name="Company" ref="cacheId"/>
        </rule>
    </rules>
</processor>
```

If the type name is ambiguous then an alias may be used as the value of the name attribute.

If a cache is referenced by an EPL query, the key properties for data in the cache must be specified. This can be done in the following ways:
1. Annotate one or more properties of the value class for the cache with the @Key annotation.
2. List one or more key properties in a comma separated list using the key-properties attribute of the cache.
3. Specify a key class for the cache.

Appendix II shows some sample applications that use caches. Whether the cache is local or distributed is specified in the configuration for the caching system and does not impact the topology of the event processing network.

Appendix III shows a XML Schema for Native BEA Cache.

Figure 2:
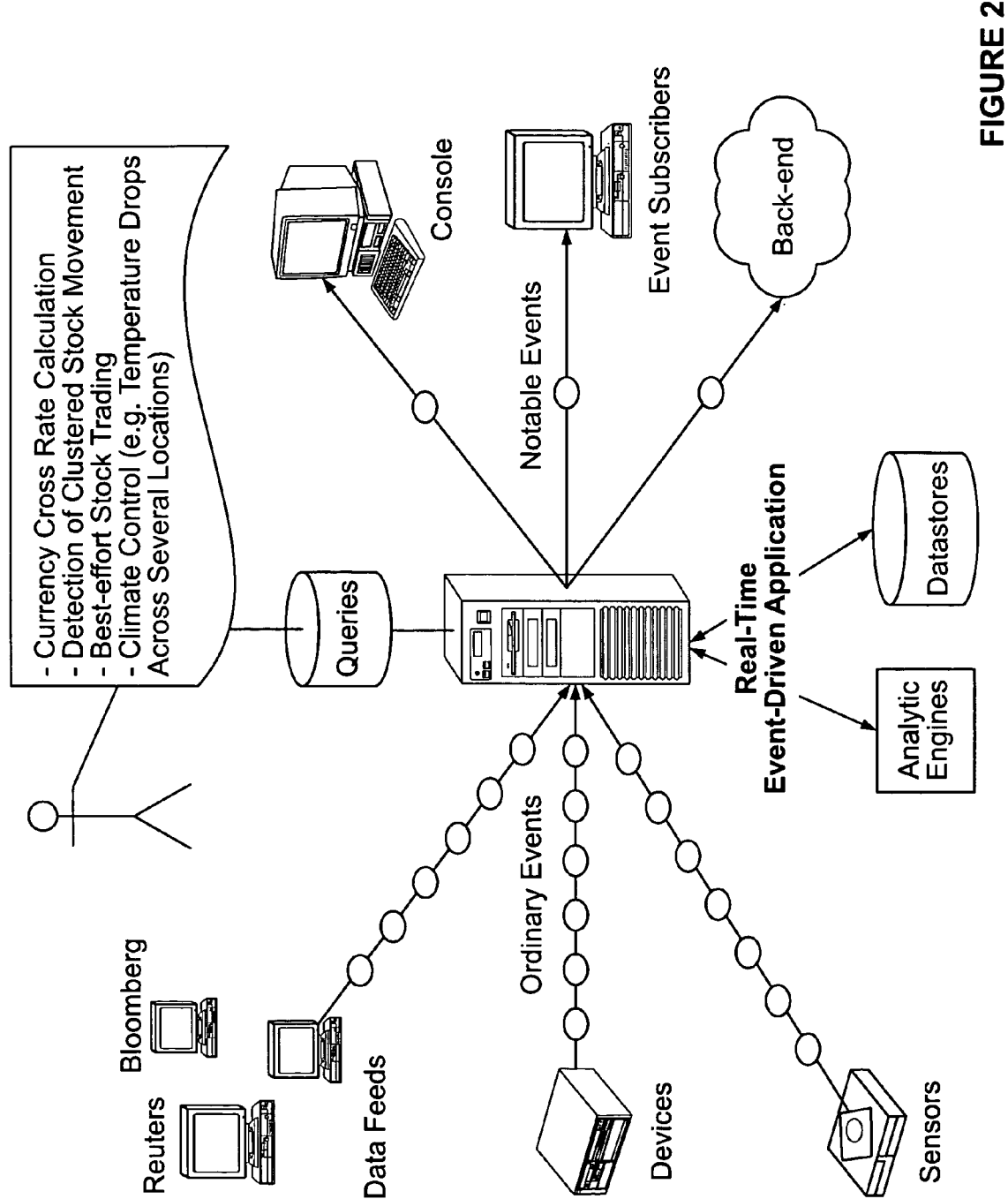
FIG. 2 shows an event server of one embodiment.

An exemplary event server is shown in FIG. 2. An Event Server can be a low latency framework, such as JAVA based middleware framework for event driven applications. The event server can be a lightweight application server which can connect to high volume data feeds and can have a complex event processing engine (CEP) to match events based on user defined rules.

The Event Server can have the capability of deploying user JAVA code (POJOs) which contain the business logic. Running the business logic within the Event Server can provide a highly tuned framework for time and event driven applications.

An event-driven system can be comprised of several event sources, the real-time event-driven (WebLogic Event Server) applications, and event sinks. The event sources can generate streams of ordinary event data. The Event Server applications can listen to the event streams, process these events, and generate notable events. Event sinks can receive the notable events.

Event sources, event-driven applications, and event sinks can be de-coupled from each other; one can add or remove any of these components without causing changes to the other components.

Event-driven applications can be rule-driven. These rules, or queries, which can be persisted using some data store, are used for processing the inbound stream of events, and generating the outbound stream of events. Generally, the number of outbound events can be much lower than that of the inbound events.

The Event Server can be a middleware for the development of event-driven applications. The Event Server application can be essentially an event-driven application.

Figure 3:
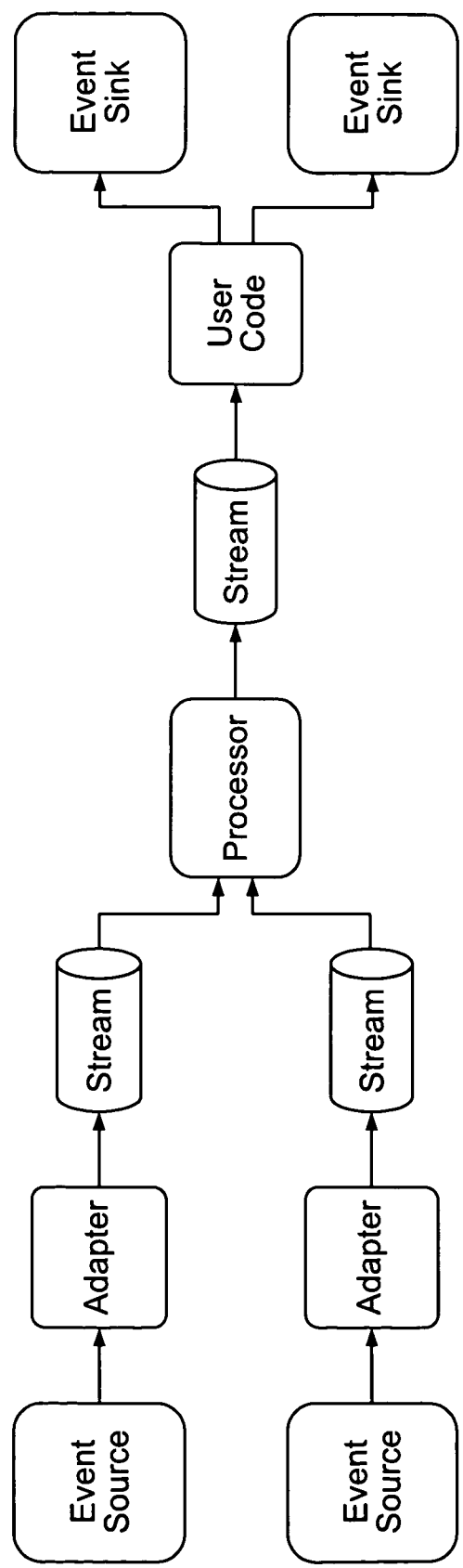
FIG. 3 shows a realtime application that can run on an event server.

An application can be hosted by the Event Server infrastructure, a light-weight container. The application can be as described by the diagram of FIG. 3.

An Event Server application can be comprised of four main component types. Adapters can interface directly to the inbound event sources. Adapters can understand the inbound protocol, and be responsible for converting the event data into a normalized data that can be queried by a processor (i.e. event processing agent, or processor). Adapters can forward the normalized event data into Streams. Streams can be event processing endpoints. Among other things, streams can be responsible for queuing event data until the event processing agent can act upon it. The event processing agent can remove the event data from the stream, process it, and may generate new events to an output stream. The user code can register to listen to the output stream, and be triggered by the insertion of a new event in the output stream. The user code can be generally just a plain-old-JAVA-object (POJO). The user application can make use of a set of external services, such as JMS, WS, and file writers, to forward on the generated events to external event sinks.

Adapters, streams, processors, and business logic POJOs can be connected arbitrarily to each other, forming event processing networks (EPN). Examples of topologies of EPN's are:

Adapter>Stream>Business Logic POJO
Scenario: no processing is needed, aside adaptation from proprietary protocol to some normalized model.

Adapter>Stream>Processor>Stream>Business Logic POJO
Scenario: straight through processing to user code.

Adapter>Stream>Processor>Stream>Business Logic POJO>Stream>Processor>Stream→Business Logic POJO
Scenario: two layers of event processing, the first processor creates causality between events, and the second processor aggregates events into complex events.

Event Processing Networks can have two important attributes.

First, event processing networks can be used to create hierarchy of processing agents, and thus achieve very complex processing of events. Each layer of the Event Processing Network can aggregate events of its layer into complex events that become simple events in the layer above it.

A second attribute of event processing networks is that it helps with integrability, that is, the quality of having separately developed components work correctly together. For example, one can add user code and reference to external services at several places in the network.

The use cases for the Event Server can span a variety of businesses:

Financial: Algorithmic Trading:
Automate stock trading based on market movement. Sample query: if, within any 20 second window, StockB rises by more than 2% and StockA does not, then automatically buy StockA.

Transportation: Security and Fraud Detection:
Discover fraudulent activity by detecting patterns among events. Sample query: if a single ID card is used twice in less than 5 seconds to gain access to a city's subway system, alert security for piggybacking.

Energy and Telecommunications: Alarm Correlation:
Reduce false positive alarms. Sample query: When 15 alarms are received within any 5 second window, but less than 5 similar alarms detected within 30 seconds, then do nothing.

Health Care: Patient Monitoring:
Monitor the vital signs of a patient and perform some task if a particular event happens. Sample query: When a change in medication is followed by a rise in blood pressure within 20% of maximum allowable for this patient within any 10 second window, alert nearest nurse.

An application server can support deployment of Plain Old JAVA applications (POJOs), or Spring applications, for handling large volumes of streaming data with low latency requirements.

Event Server applications can be developed and deployed as event driven applications, that is, a set of custom Spring tags is used to define the event processing network in the EPN assembly file, which extends the standard Spring context file, of your application.

The application server can contain a set of real time services that include a complex event processor (CEP), adapters, and streams. The server can be tuned for high message throughput and low latency and deterministic behavior.

The complex event processor can be a high performance, continuous query engine for processing high volumes of streaming data. It can have full support for filtering, correlation, and aggregation of streaming data from one or more streams.

An event processing language can be used. The Event Processing Language (EPL), can be a SQL-like language that allows event data from streams to be declaratively filtered, correlated, aggregated, and merged, with the ability to insert results into other streams for further downstream processing. The EPL rules can be defined in an XML file that configures the complex event processor or programmatically using APIs.

An Adapter SDK can provide all the tools you need to create adapters that listen to incoming data feeds.

A load generator utility can simulate a data feed, useful for testing your application without needing to connect to a live data feed.

A monitoring service can include pre-built instrumentation for measuring throughput and latency at the component level.

A static and dynamic configuration framework can be used. Static configuration can be performed using XML files; dynamic configuration can be performed by accessing configuration and runtime MBeans using JMX and with the command-line utility wlevs.Admin.

The Event Server can be built on a microServices Architecture (mSA) which can use an OSGi-based framework to manage services provided by modules or feature sets. A mSA can provide the following services:

Jetty, an HTTP container for running servlets.
javax.sql.DataSource implementation and thin JDBC drivers for accessing a relational database.
Logging and debugging.
Authentication and authorization security.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A system adapted to receive events from an input stream and produce an output event stream, the system comprising:
    a computer which includes a microprocessor;
    an event server including an event processor which executes on the computer,
        wherein the event processor uses an event processing language (EPL) code to process events,
        wherein the event server is implemented as part of an event processing network (EPN), and
        wherein the EPN is defined by an EPN assembly file that indicates a plurality of event sources, event sinks, and stream components and the event processor, which are used to process events;
    a cache registered as a sink and configured as a listener enabling the cache to receive events published to a stream by an event server application, and store the published events in the cache for use by a plurality of applications in the event server before asynchronously writing the published events to a secondary storage,
    wherein the EPN assembly file indicates deployment of the cache including whether the cache is local or distributed;
    a query processor for querying streams to pull data during query evaluation,
        wherein the cache appears to the query processor as a stream which can be queried to pull data; and
    an event type repository which registers the cache and a data type of data associated with the published events stored in the cache, and
        wherein upon registering the cache as a sink, the event type repository indicates that the event processor uses one or more input streams as sources of events.

2. The system of claim 1, wherein the cache is a JCache based cache.

3. The system of claim 1, wherein the cache is indexed using one or more keys specified when the cache is declared.

4. The system of claim 1, wherein the cache generates an event when a new mapping is inserted into the cache.

5. The system of claim 1, wherein the EPL code references the cache and the one or more input streams the same way, and performs an inner join between events from the input streams and the data held in the cache.

6. The system of claim 5, wherein the inner join is performed using a user-defined function.

7. A method of providing an event server adapted to receive events from an input stream and produce an output event stream, the method operating on one or more microprocessors and comprising:
    providing an event server as part of an event processing network (EPN),
        wherein the EPN is defined by an EPN assembly file that indicates a plurality of event sources, event sinks, and stream components and an event processor, which are used to process events;
    receiving events via the event processor, wherein the event processor uses an event processing language (EPL) code to process the events;
    determining, via an event type registry, that the EPL code requires a particular data type in processing the events;
    publishing events to an input stream via an event server application, wherein the published events are stored in a cache registered as a sink and configured as a listener for use by a plurality of applications in the event server, before asynchronously writing the published events to a secondary storage,
        wherein the EPN assembly file indicates deployment of the cache including whether the cache is local or distributed;
    querying streams, via a query processor, to pull data during query evaluation,
        wherein the cache appears to the query processor as a stream which can be queried to pull data; and
    providing an event type repository which registers the cache and a data type of data associated with the published events stored in the cache, and
        wherein upon registering the cache as a sink, the event type repository is configured to indicate that the event processor uses one or more input streams as sources of events.

8. The method of claim 7, wherein the cache is a JCache based cache.

9. The method of claim 7, wherein the cache is indexed using one or more keys specified when the cache is declared.

10. The method of claim 7, wherein the cache generates an event when a new mapping is inserted into the cache.

11. The method of claim 7, wherein the EPL code references the cache and the one or more input streams the same way, and performs an the inner join between events from the input streams and the data held in the cache.

12. The method of claim 11, wherein the inner join is performed using a user-defined function.

13. A non-transitory computer readable storage medium including instructions stored thereon which when read by a computer cause the computer to perform the steps comprising:
    providing an event server as part of an event processing network (EPN),
        wherein the EPN is defined by an EPN assembly file that indicates a plurality of event sources, event sinks, and stream components and an event processor, which are used to process events;
    receiving events via the event processor, wherein the event processor uses an event processing language (EPL) code to process the events;
    determining, via an event type registry, that the EPL code requires a particular data type in processing the events;
    publishing events to an input stream via an event server application, wherein the published events are stored in a cache registered as a sink and configured listener for use by a plurality of applications in the event server, before asynchronously writing the published events to a secondary storage,
wherein the EPN assembly file indicates deployment of the cache including whether the cache is local or distributed;
querying streams, via a query processor, to pull data during query evaluation,
wherein the cache appears to the query processor as a stream which can be queried to pull data; and
providing an event type repository which registers the cache and a data type of data associated with the published events stored in the cache, and
wherein upon registering the cache as a sink, the event type repository is configured to indicate that the event processor uses one or more input streams as sources of events.

14. The non-transitory computer readable storage medium of claim 13, wherein the cache is a JCache based cache.

15. The non-transitory computer readable storage medium of claim 13, wherein the cache is indexed using one or more keys specified when the cache is declared.

16. The non-transitory computer readable storage medium of claim 13, wherein the cache generates an event when a new mapping is inserted into the cache.

17. The non-transitory computer readable storage medium of claim 13, wherein the EPL code references the cache and the one or more input streams the same way, and performs an inner join between events from the input streams and the data held in the cache.

* * * * *

UNITED STATES PATENT AND TRADEMARK OFFICE
CERTIFICATE OF CORRECTION

PATENT NO. : 9,542,708 B2  
APPLICATION NO. : 12/332276  
DATED : January 10, 2017  
INVENTOR(S) : Piper et al.

Page 1 of 1

It is certified that error appears in the above-identified patent and that said Letters Patent is hereby corrected as shown below:

In the Claims

In Column 14, Line 46, in Claim 11, delete "an the" and insert -- the --, therefor.

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*